United States Patent [19]

Holland

[11] Patent Number: 4,561,297

[45] Date of Patent: Dec. 31, 1985

[54] HAND-HELD DIESEL ENGINE INJECTION TESTER

[75] Inventor: Ernest Holland, Daventry, England

[73] Assignee: V L Churchill Limited, Daventry, England

[21] Appl. No.: 581,063

[22] Filed: Feb. 17, 1984

[30] Foreign Application Priority Data

Nov. 3, 1983 [GB] United Kingdom ................. 8329399

[51] Int. Cl.[4] ............................................ G01M 15/00

[52] U.S. Cl. .................................. 73/119 A; 73/4 R; 73/49.7

[58] Field of Search .................... 73/119 A, 49.7, 168, 73/4 R, 37; 417/234; 222/175

[56] References Cited

U.S. PATENT DOCUMENTS 3,408,862 11/1968 Hainz ................................ 73/119 A 3,557,602 1/1971 Frantz .................................. 73/4 R

*Primary Examiner*—Jerry W. Myracle

*Attorney, Agent, or Firm*—Kemon & Estabrook

[57] ABSTRACT

A hand-held diesel engine tester, includes a hand operable pump, a reservoir for liquid to be pumped, connection elements for said injector and a liquid pressure indicator or a connection for a liquid pressure indicator.

7 Claims, 3 Drawing Figures

HAND-HELD DIESEL ENGINE INJECTION TESTER

This invention relates to hand-held diesel engine injector testers and is applicable particularly, but not exclusively to such testers for testing injectors of diesel engines which are not readily accessible to workshops, such as vehicle engines broken down at the roadside.

Diesel engine injector testers are already known in which a hand-operable pump is used to generate high pressure in a quantity of liquid, the pressure being applied to an injector, and a pressure indicator, usually a gauge, indicates the value of the liquid pressure. Such testers are used primarily for three tests, in one test the liquid pressure is raised by the pump until the injector just opens and that pressure (the cracking pressure) is read being up to 4500 p.s.i. (31 M Pa) and typically 3000 p.s.i. (20.7 M Pa).

For the second test (the back leakage test) the liquid pressure is raised to a value less than the cracking pressure and the time taken for the pressure to drop by a specified amount. The pressure drop is typically 500 p.s.i. (3.4 M Pa) in 5 seconds and indicates the rate of liquid back leakage through the injector when it is normally closed.

The third test consists of maintaining a high pressure and watching for droplets of liquid at the injector nozzle.

The known diesel injector testers are generally of such massive proportions and construction that they can only be used in a workshop and are not readily transportable and usable at, for example, a roadside breakdown of a vehicle.

By the design features and materials used in the tester according to the invention a tester has been devised which can readily be taken in a mechanic's toolbox to the site of intended use.

Conveniently the piston is moved by a hand-operated screw.

According to the invention there is provided a hand-held diesel engine tester, including a hand operable pump, a reservoir for liquid to be pumped, connection means for said injector and a liquid pressure indicator or a connection for a liquid indicator.

Preferably the body of the tester is made of aluminium. The pump may include a cylinder formed in the body, and a piston slidable in the cylinder, and in which the cylinder is formed with a hard anodised internal surface. The piston may be fitted with a seal of plastics material.

Advantageously the tester includes a chamber to be filled with liquid connected operatively between the outlet non-return valve and the connection means for the injector, said chamber volume being selected to ensure a required length of back leakage time.

The invention is described by way of example only, with reference to the accompanying drawings, in which.

Figure 1:
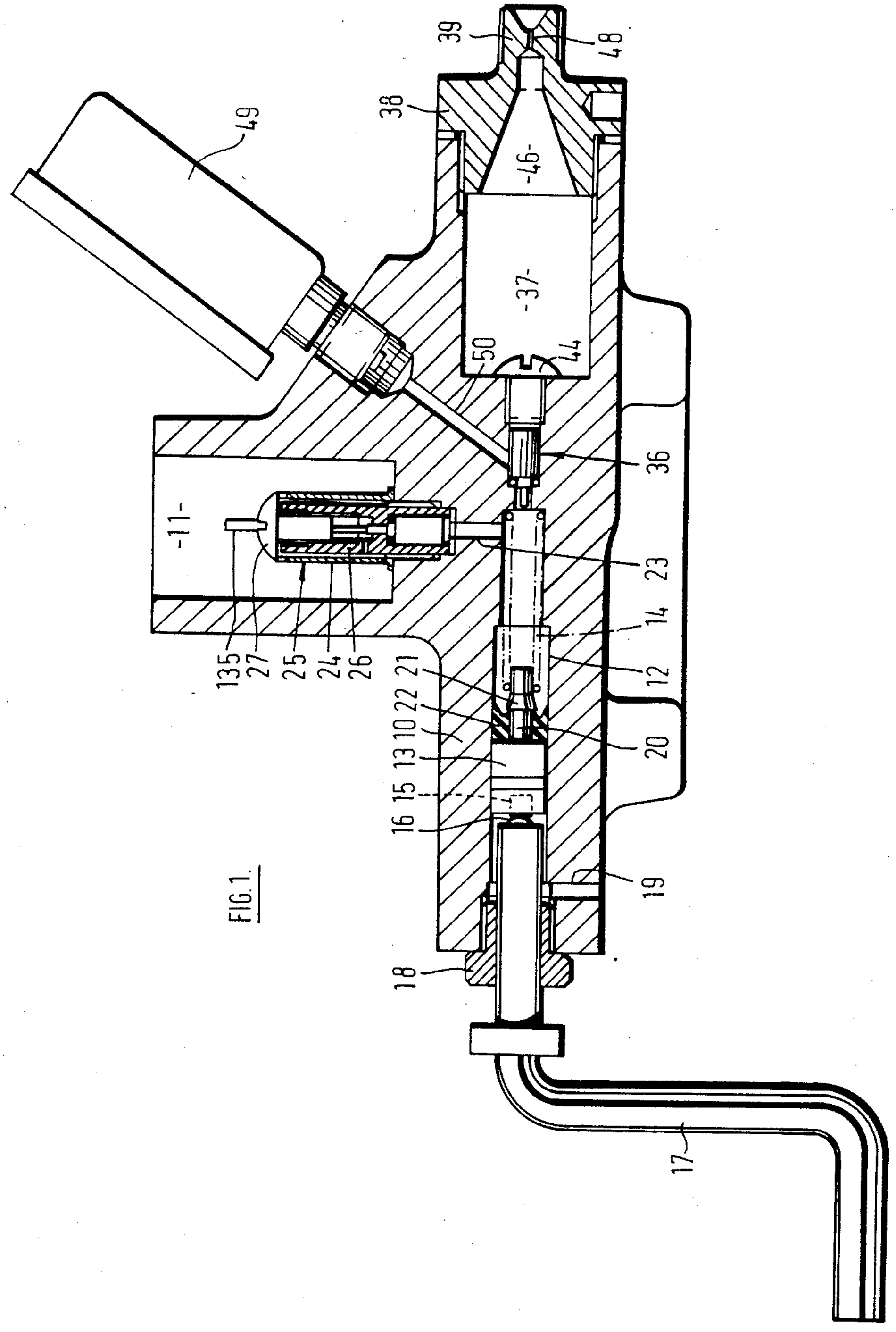
FIG. 1 is a longitudinal section in a vertical plane.

In the drawings, a hand-held diesel engine injector tester has a body 10 of cast aluminium, for lightness. The form of the body 10 is generally of an inverted T shape, having a reservoir 11 for liquid in the upper stem of the T.

Several coaxial horizontal bores are formed through the body 10, one of them being a pump cylinder 12 having a fine finish and a hard anodised surface. A piston 13 in the cylinder 12 is urged towards the left, in FIG. 1, by a spring 14. The piston 13 has a small steel insert 15 of which a hardened face abuts a steel ball 16 set in the centre of the end of a screw threaded cranked operating handle 17. The threaded portion of the handle 17 is screwed into a nut 18, which is screwed into the end of the cylinder 12. The space between the piston 13 and the nut 18 is vented by a small hole 19. The piston 13 has a coaxial snout 20 into the centre of the spring 14, having a ramped collar 21 which retain a plastic seal 22.

Figure 2:
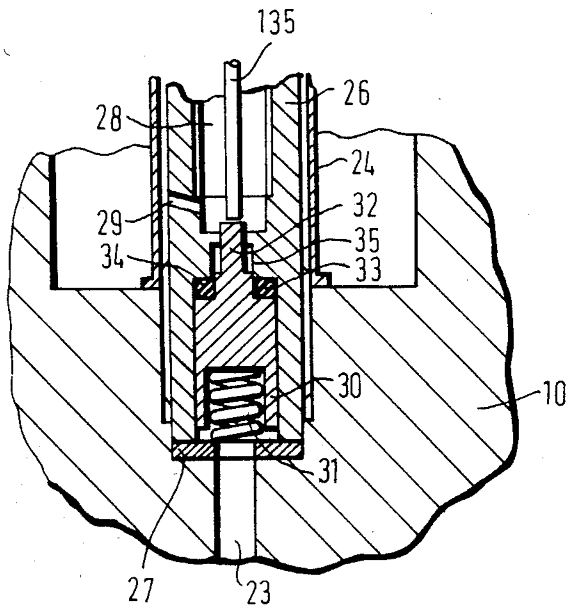
FIG. 2 is an enlarged view of a valve shown in FIG. 1.

A vertical bore 23 connected into the cylinder 12 conducts liquid from reservoir 11 into the cylinder 12, the liquid passing through a filter 24 and inlet valve 25 described more fully with reference to FIG. 2. The inlet valve 25 has an elongate cylindrical threaded body 26 which is screwed into the tester body 10 down to a sealing washer 27. The filter 24 is in the form of a gauze cartridge which abuts the slotted head 27 of a central screw 28 in the inlet valve body 26. Liquid which has been filtered enters the central cavity of the inlet valve body 26 through one or more inclined drillings 29.

In the lower part of the inlet valve body 26 a plunger 30 is slidable. It is formed with a coaxial snout 32 around which is fitted an O-ring 33. The O-ring 33 is urged by the spring 31 against a shoulder 34 at the bottom of a bore 35 in the body 26. The snout 32 is formed with a lower portion which is a close fit in the bore 35, and an upper portion of reduced diameter. A tickler rod 135 is slidable through a bore in the screw 28, whereby an operator may depress the plunger 30 for bleeding purposes. The plunger 30 has a flat along one side, or other similar feature by which liquid from the reservoir 11 which has passed the O-ring 33 may flow into the bore 23.

It has been found that the provision of the soft seal in the form of the O-ring 33 provides a good and durable seal when subject to the high pressures in the bore 23, while enabling the inlet valve 25 to open when the liquid pressure in the bore 23 drops only a modest amount below the pressure of liquid in the reservoir 11. The larger diameter portion of the snout 32 provides an initial seal as the valve 25 closes, thus protecting the O-ring 33 from extrusion.

When the handle 17 is rotated so as to move the piston 13 toward the right in FIG. 1, the inlet valve 25 promptly closes and liquid in the cylinder 12 is displaced through an outlet valve 36 into a chamber 37, the right-hand side of which is closed by a plug 38 having a standard diesel pipe connector fitting 39, to which the injector to be tested can be connected by a length of steel diesel pipe.

Figure 3:
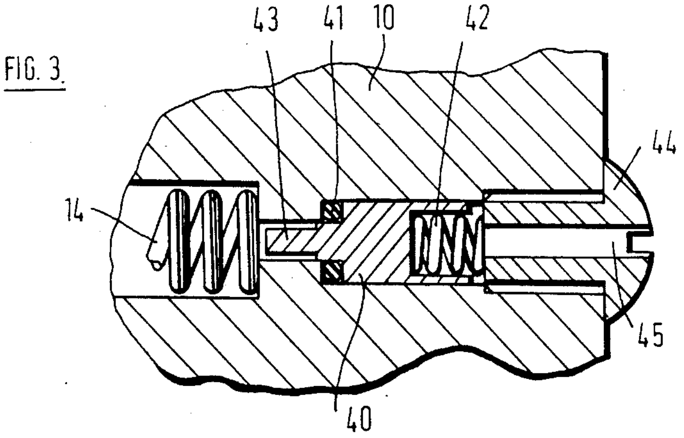
FIG. 3 is an enlarged view of another valve shown in FIG. 1.

The outlet valve 36 is shown in more detail in FIG. 3 and comprises a plunger 40, O-ring 41, spring 42 and snout 43, all identical to the comparable elements in the inlet valve 25. The spring abuts a screw 44 coaxial with the plunger 40 and having a central hole 45, through which liquid can pass into the chamber 37. The reservoir 11 is closed by an unshown cap or plug having an openable vent means. The plug 38 has a conical interior 46, extending near the maximum diameter of the chamber 37, so that the ejector tester may be bled of air by inclining it through approximately 20°, with the right-hand end of the cone 46 uppermost, so that any air therein can pass through the fine bore 48, of approximately 1 m.m diameter to the atmosphere, without spilling liquid from the reservoir 11.

It has been found that when the reservoir 11 is sealed from the atmosphere, liquid in the system does not escape through the bore 48, even if it is left unplugged and the injector tester is given the normal handling of a mechanics tool kit.

A standard liquid pressure gauge 49 is screwed into the body 10 and is connected by a passage 50 into the liquid and to the right-hand side of the O-ring 41 in the outlet valve 36.

In use an oil of known kind, suitable for testing diesel engine injectors, is put into the reservoir 11, the plug 38 is raised until the upper wall of the cone 46 is substantially horizontal and the handle 17 is wound back and forth until air is expelled from the system and the liquid appears through the fine bore 48. Bleeding of air is assisted by periodical depression of the tickler rod 135 and by partial release of the pressure gauge 49 so that the passage 50 can be cleared of air.

On completion of the bleeding process, the diesel engine injector which is to be tested is connected to the connector 39, the handle 17 is rotated so as to draw the piston 13 to the left, thus drawing the liquid from the reservoir 11 through the inlet valve 25 into the cylinder 12. The handle 17 is then rotated in the opposite direction to move the piston 13 towards the right in FIG. 1, causing the inlet valve 25 to close and the outlet valve 36 to open. Since the injector to be tested will generally be closed, the pressure within the cylinder 12, outlet valve 36 and chamber 37 will rise, being meanwhile indicated on the gauge 49. This process is continued until the injector just starts to crack open, at which point the pressure is recorded.

For a back leakage test, the process is repeated except that the pressure is raised to a predetermined value which is somewhat less than the injector cracking pressure. Rotation of the handle 17 is then stopped and the pressure on the gauge 49 observed. Since there will normally be some leakage of the injector, the time taken for the pressure on the gauge 49 to fall by a predetermined amount is taken and is a measure of the wear within the injector. Clearly, the time taken for the liquid pressure to drop by the predetermined amount during the back leakage test depends on the amount of energy stored in the system. In order to obtain pressure drop times which are sufficiently long to record and also which are comparable to those specified for workshop type of diesel engine injector testers it has been found necessary to provide the chamber 37 of substantial proportions, for example as shown in FIG. 1, so that it may contain substantial volume of liquid. The compressibility of the liquid and expansion under pressure of the walls of the chamber 37 ensure that the rate of pressure drop due to leakage through the injector is a required magnitude.

I claim:

1. A hand-held diesel engine injector tester, including a hand operable pump, a reservoir for liquid to be pumped, connection means sized to accept a diesel injector coupling pipe for said injector and a connection for a liquid pressure indicator.

2. A hand-held diesel engine injector tester, including a hand operable pump, a reservoir for liquid to be pumpted, connection means sized to accept a diesel injector coupling pipe for the said injector and a liquid pressure indicator.

3. A tester, as in claim 2, including a body of the tester, made of aluminium.

4. A tester, as in claim 3, in which the pump includes a cylinder formed in the body, and a piston slidable in the cylinder, and in which the cylinder is formed with a hard anodized internal surface.

5. A tester, as in claim 4, in which the pump includes a piston fitted with a seal of plastics material.

6. A tester, as in claim 2, in which the liquid pressure indicator is connected operatively between an outlet non-return valve of the pump and the connection means for the injector.

7. A tester, as in claim 6, including a chamber of pre-determined volume to be filled with liquid connected operatively between the outlet non-return value and the connection means for the injector, said chamber volume being selected to ensure a required length of back leakage time.

* * * * *